ELECTRICAL INFORMATION STORAGE MEANS

INVENTORS
FREDERIC C. WILLIAMS,
TOM KILBURN,
GEOFFREY C. TOOTILL
BY Stevens, Davis, Miller & Mosher
ATTORNEYS INVENTORS
FREDERIC C. WILLIAMS,
TOM KILBURN,
GEOFFREY C. TOOTILL
BY Stevens, Davis, Miller & Mosher
ATTORNEYS May 24, 1955 F. C. WILLIAMS ET AL 2,709,230

ELECTRICAL INFORMATION STORAGE MEANS

Original Filed June 2, 1950 3 Sheets-Sheet 3

INVENTORS
FREDERIC C. WILLIAMS,
TOM KILBURN,
GEOFFREY C. TOOTILL

BY Stevens, Davis, Miller & Mosher
ATTORNEYS

United States Patent Office 2,709,230

Patented May 24, 1955

2,709,230

ELECTRICAL INFORMATION STORAGE MEANS

Frederic Calland Williams, Romily, Tom Kilburn, Davyhulme, and Geoffrey Colin Tootill, Swindon, England, assignors to National Research Development Corporation, London, England, a corporation of Great Britain Continuation of application Serial No. 165,622, June 2, 1950. This application May 8, 1953, Serial No. 353,819

Claims priority, application Great Britain June 7, 1949

12 Claims. (Cl. 315—22)

Figure 1:
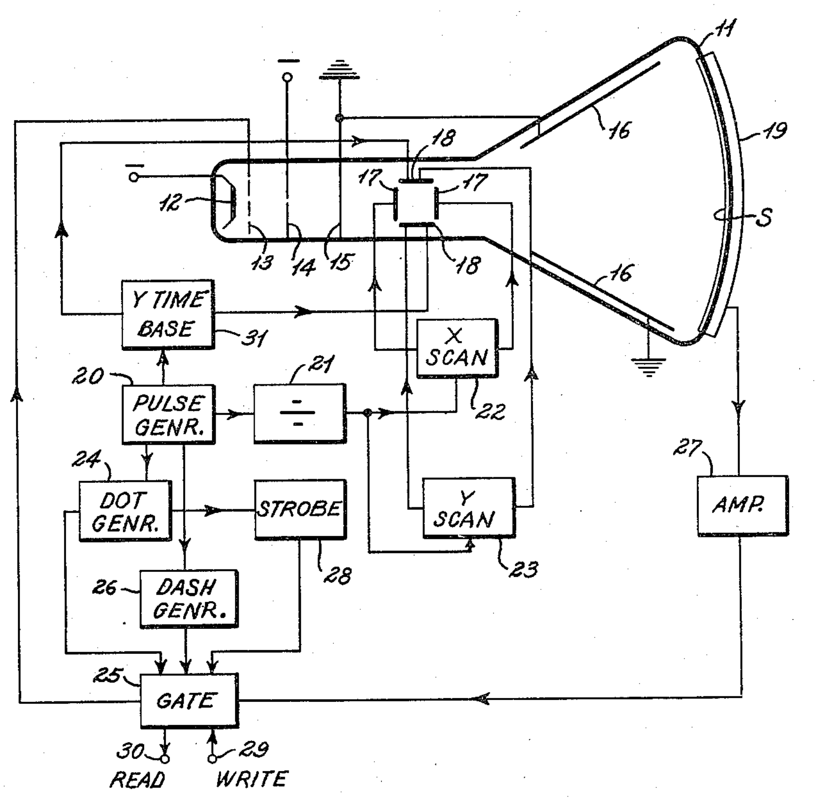

The present invention relates to electrical information storage devices of the type in which an insulator is scanned by an electron beam to set up electric charges representing the information to be stored. Such a device is described for example in United States patent specification Serial No. 790,879, filed December 10, 1947.

The present application is a continuation of our co-pending application Serial No. 165,622, filed June 2, 1950, for "Electrical Information Storage Means."

Such storage devices are used in binary digital computing machines in which there is stored on one or more lines of the insulating surface a "word" that is to say a number of digits representing, according to the binary system of notation, a numerical quantity or representing an instruction. Three methods of storing such "words" are described respectively in the above-numbered specification and in the specifications of co-pending patent applications Serial No. 50,136, filed September 20, 1948; 124,192, filed October 28, 1949, and 124,577, filed October 31, 1949, and are discussed together in a paper by F. C. Williams and T. Kilburn entitled "A storage system for use with binary digital computing machines," published in "Proceedings of the Institution of Electrical Engineers," vol. 96, part III, No. 40, page 81, March 1949. The method which has hitherto been most used is the one described in the specification of application Serial No. 50,136, filed September 20, 1948, and referred to in the paper as "dot-dash." In this "dot-dash" system information of one kind (e. g. the binary digit "0") is stored by intensifying the beam while it is stationary or is sweeping over a short length of line and information of a second kind (e. g. the binary digit "1") is stored by intensifying the beam when it is sweeping over a longer length of line.

The two states of charge corresponding to the digits "0" and "1" are regenerated by using the initial transient generated in a pick-up plate capacitively coupled to the surface of the insulator bearing the charges, since a dot gives rise to a negative-going initial transient and a dash to a positive-going initial transient when the charged areas are illuminated (that is irradiated) by the beam. The initial transient can, therefore, be applied to control the beam intensity in such a way that a dash is "written" when the initial transient is positive and a dot when the transient is negative.

Now in devices of this kind it has been found that there is a minimum spacing which can be used between the lines because the illumination of an area can lead to disturbance of the charges stored in areas in neighbouring lines. This effect is called action line limitation and is discussed in the paper referred to above.

The effect is not so great in the direction of the line for two reasons. Firstly because any spread due to illumination of the "tail" of a dash is slight and is quickly corrected when the next dot (or the first part or "head" of the next dash) is illuminated and secondly because the spread produced by a dot on the tail of the previous dash is not so serious because the tail of the dash has only a small effect on the production of the regenerating transient, if the scanning beam is caused to pause while illuminating a dot and the head of a dash. Accordingly the spacing in the line can be closer than the spacing between the lines.

An object of this invention is to provide means for storing information whereby a greater number of digits can be stored on a given length of line and hence on a given area of insulating surface than in the previously proposed means.

According to this invention in an information storage device of the type described information of one kind is stored by intensifying the electron beam when it is stationary or is sweeping over a length of line and information of a second kind is stored by applying the electrical output from a time-base circuit to beam deflection means to deflect the beam in a direction at an angle to said line either when the beam is stationary or is sweeping over a length of line.

Figure 2:
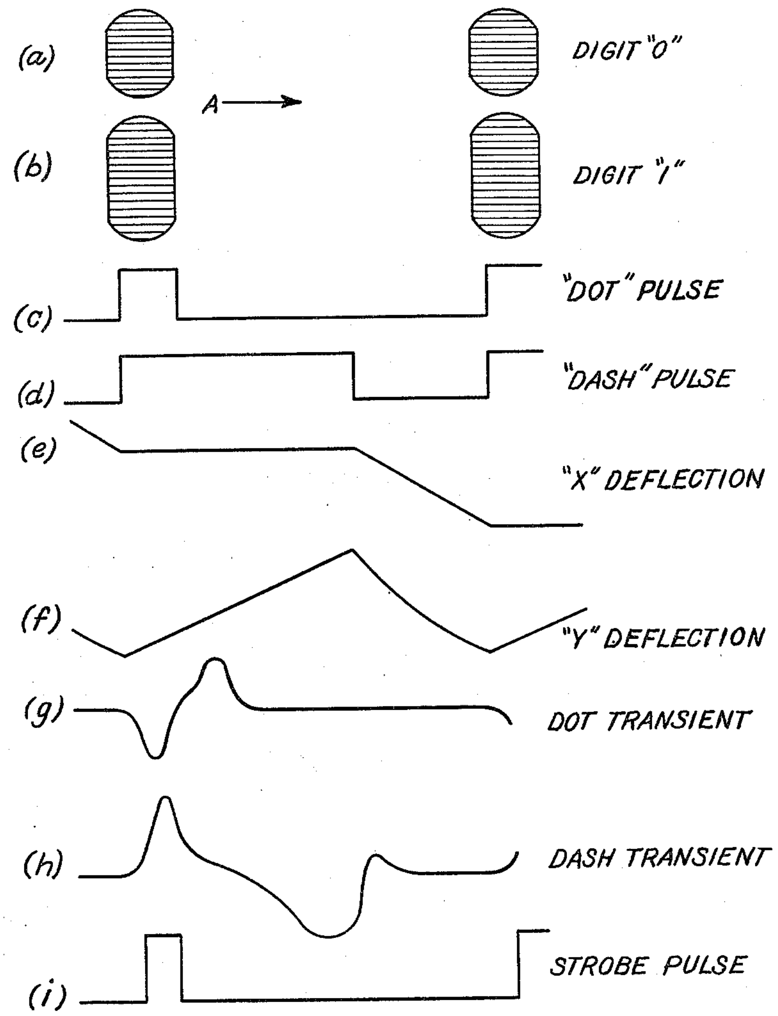
Figure 3:
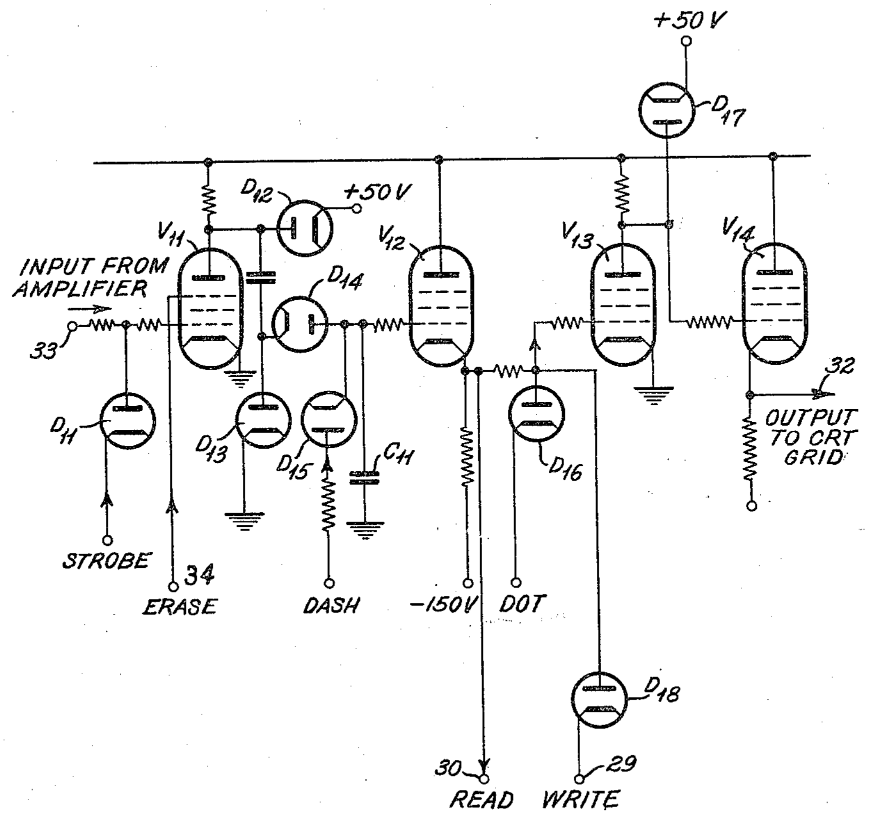

The invention will be better understood by reference to the accompanying drawings in which Figure 1 is a block-schematic diagram of storage means according to this invention, Figure 2 shows waveforms illustrating the operation of the storage means shown in Figure 1, and Figure 3 is a circuit diagram of the gate circuit of Figure 1.

Referring first to Figure 1 there is shown a cathode ray tube 11 employed as a digit store. The tube comprises a cathode 12, a control grid 13, a first anode 14, a second anode 15 and a third anode 16 constituted by a conducting surface on the wall of the tube adjacent to the screen S of the tube and X and Y deflecting plates 17 and 18 respectively. The second and third anodes 15 and 16 are held at earth potential and the remaining electrodes have suitable negative potentials applied to them to cause the beam to operate at a beam velocity such that when a spot on the screen is bombarded with electrons the number of secondary electrons initially emitted from the spot exceeds the number of primary electrons which arrive. A signal pick-up electrode 19 is held securely on the outside wall of the tube adjacent to the screen. Numbers in binary form are stored as charge patterns on a number of parallel lines on the cathode ray tube screen, the digit "0" being stored by causing electrons to fall on an area shown in Figure 2(*a*) and the digit "1" being stored by causing electrons to fall on an area shown in Figure 2(*b*).

A pulse generator 20 produces regularly recurring pulses which are used to synchronise the operation of all the correlated parts of the apparatus. These pulses are fed to a divider circuit 21 which counts down to provide synchronising pulses for the X time-base generator 22 and the Y time-base generator 23 which provide deflection voltages which are applied to the X and Y deflector plates to set up a raster of a number of horizontal lines; between lines the electron beam of the cathode ray tube is blacked out. The particular form of Y scan employed is described in detail in the specification of U. S. patent application Ser. No. 93,612, filed May 16, 1949. Briefly it causes the lines to be explored sequentially but alternately with any selected line. Thus if line 10 is selected the scanning, beginning with line 1 proceeds 1, 10, 2, 10, 3, 10, etc. This form of Y scan, therefore, enables the information on any selected line to be read without the need to wait until this line is reached in the normal sequential scanning process. Each line is divided into a number of elements and during the scan of a line each element is normally illuminated by applying a dot pulse shown in Figure 2(*c*) from a dot pulse generator 24 through a gate circuit 25 to the cathode ray tube grid. The dot pulse generator is synchronised by the pulse generator 20. However, an element can also be illuminated by applying to the cathode ray tube grid through the gate circuit 25, a dash pulse shown in Figure 2(*d*) obtained from a dash pulse generator 26. The dash pulse generator is also synchronised by the pulse generator 20.

The waveform of the voltage output of the X scan generator 22 is shown in Figure 2(*e*) and as can be seen it contains steps of constant voltage whereby the beam is caused to pause for the duration of each dash pulse. Output pulses from the pulse generator 20 are also applied to a further Y time-base circuit 31 which produces a time-base voltage shown in Figure 2(*f*) having a working stroke extending over the duration of a dash pulse and a fly-back stroke between the working strokes.

When the digit "0" is to be recorded on an element the electron beam of the cathode ray tube is switched on by applying a dot pulse to the cathode ray tube control grid. Simultaneously the electron beam is deflected a little in the Y direction by the initial portion of the scan period of the time-base voltage shown in Figure 2(*f*). Electrons, therefore, reach an area represented in Figure 2(*a*). In Figures 2(*a*) and 2(*b*) the direction of scanning is indicated by an arrow A. When the digit "1" is to be recorded the electron beam of the cathode ray tube is switched on by applying a dash pulse shown in Figure 2(*d*) to the cathode ray tube grid. Whilst the beam is thus switched on it is deflected by one whole working stroke of the time-base voltage shown in Figure 2(*f*), the electrons therefore reaching an area shown in Figure 2(*b*).

Although the direction of the deflection produced by the time-base 31 is preferably at right angles to the line of scan, it may be at an acute angle thereto.

In an alternative rraangement the initial part of the waveform at Figure 2(*f*) may be level, that is to say the beam may be held stationary during the "dot" period so that the dot produced is not slightly elongated.

It may be noted here that the spacial length of the dash may easily be adjusted by adjusting the slope of the waveform at Figure 2(*f*). This is more convenient than in the previous dot-dash system in which the spacial length of a dash was dependent upon the timing of the various pulses and the velocity of scanning and was not readily adjustable.

When an element is illuminated during a scan, a transient pulse signal is generated in the pick-up electrode 19 having a sign dependent on whether a charge due to a stored "0" digit was previously recorded or whether a charge due to a stored "1" digit was previously recorded. If a charge due to a "0" digit was recorded a negative signal as shown in Figure 2(*g*) will be generated and if charge due to a "1" digit was recorded a positive signal as shown in Figure 2(*h*) will be generated. The reason for this will be made clear by a perusal of the aforementioned paper.

The transient signals are used to regenerate the stored information in a manner now to be explained. Signals from the pick-up electrode 19 are amplified in an amplifier 27 and fed to the gate circuit 25. The gate circuit 25 is also fed with strobe pulses, shown in Figure 2(*i*) obtained from a strobe pulse generator 28 and synchronised by the dot pulse generator 24. If a positive transient pulse signal, obtained by illuminating the beginning of a charged area of dash shape on the cathode ray tube screen corresponding to a stored "1" digit, is fed to the gate circuit 25, the gate circuit operates to cause a dash area to be regenerated on the screen by applying a dash pulse from the dash pulse generator 26 to the cathode ray tube grid, otherwise a dot pulse from the dot pulse generator 24 will be applied to the cathode ray tube grid and a dot area will be recorded.

New information can be written on the cathode ray tube screen by applying signals to the gate circuit 25 via terminal 29. Output signals for a further part of the computor consisting of a dash pulse for each stored "1" digit may be read out from the gate circuit 25 via terminal 30.

The gate circuit 25 may have the form shown in Figure 3. In this figure, dot pulses, which are negative-going from a rest level of +5 volts, from the generator 24 of Figure 1 are applied through a diode $D_{16}$ to the control grid of a valve $V_{13}$. During each pulse the anode current in this valve is cut off and its voltage rises until caught by a diode $D_{17}$ at +50 volts. The resulting voltage pulse is fed to the control grid of a cathode-follower $V_{14}$ and the output voltage across the cathode load resistance of this valve is taken from terminal 32 to the control grid 13 of the cathode ray tube 11 of Figure 1. In this way dots are produced on the screen of the tube.

If a positive initial transient appears at the output of amplifier 27 (Figure 1) owing to the illumination of a dash area on the screen of the tube 11, this transient appears at terminal 33 of Figure 3 and is applied biased to −15 volts to the control grid of a valve $V_{11}$. Strobe pulses positive-going from a resting level of −10 volts, are also fed through a diode $D_{11}$ to the control grid. The anode current of valve $V_{11}$ is normally cut off and is switched on only when a positive pulse from the amplifier appears on the grid of $V_{11}$ simultaneously with a positive strobe pulse. The negative pulse produced at the anode of $V_{11}$ when the anode current of this valve is switched off is applied to the grid of a cathode-follower valve $V_{12}$ which has the upper limit of its control grid voltage defined at zero volts by diodes $D_{14}$ and $D_{13}$ and its lower limit defined at −15 volts by a diode $D_{15}$ through which negative-going dash pulses are applied from a rest level of +5 volts to the control grid of $V_{12}$. A condenser $C_{11}$ prevents the voltage on the control grid of $V_{12}$ from changing unless the grid is driven. In the presence of a dash pulse, therefore, the grid of valve $V_{12}$ is driven negative by the pulse from the anode of the valve $V_{11}$ and will remain at about −15 volts for approximately the period of the dash applied through $D_{15}$. It will then be driven to zero volts and will remain at this level until another positive pulse is applied to $V_{11}$.

The effect of the dash pulse applied to the grid of $V_{13}$ is to maintain this valve, which has already been cut off by a dot pulse, cut off for the period of a dash. In this way a dash area of charge is regenerated on the screen of the cathode ray tube. If no positive transient is applied to $V_{11}$ this indicates that a dot area of charge has been scanned and the effect is that the valve $V_{12}$ remains cut off and a dot area of charge is regenerated.

While there have been described what are at present considered to be the preferred embodiments of this invention it will be obvious to those skilled in the art that various changes and modifications may be made therein without departing from the invention, and it is, therefore, intended in the appended claims to cover by generic terms all such changes and modifications as fall within the true spirit and scope of the invention.

We claim:

1. An information storage device comprising a cathode ray tube, an electric charge retaining surface, means for sweeping the electron beam of the tube along a line over the charge retaining surface, means for intensifying the beam to produce on the said surface a first state of charge representative of one item of information, and means for deflecting the beam in a direction inclined with respect to said line, whilst the beam is intensified, in order to produce on the said surface a second state of charge representative of another item of information.

2. A device according to claim 1, wherein said direction is substantially at right angles to said line.

3. An information storage device comprising a cathode ray tube, an electric charge retaining surface, means for sweeping the electron beam of the tube along a line over the charge retaining surface, a first generator of recurrent pulses, means to apply pulses from said generator to intensify the cathode ray beam, deflecting means for deflecting the beam in a direction inclined with respect to said line, a source of recurrent deflecting voltages, said deflecting voltages being phased to occur at least partly after each of said pulses, means to apply said voltages to said deflecting means, a second generator for generating pulses phased to occur at least partly after each of the first-named pulses, and means for selectively applying pulses from said second generator to maintain intensification of said beam after the cessation of each of the first-named pulses.

4. An information storage device comprising a cathode ray tube, an electric charge retaining surface, a generator of a stepped saw-tooth time-base voltage, the waveform of said voltage comprising periods of changing voltage separated by periods of constant voltage, means for applying said voltage to deflect the beam of said tube along a line, pauses in the movement of the beam occurring during said periods of constant voltage, means for intensifying the beam during a part of each of said pauses, means for deflecting the beam in a direction inclined with respect to said line during at least part of each of said pauses, and selectively operable means for extending the periods of intensification of the beam over at least the greater part of said pauses.

5. An information storage device comprising a cathode ray tube, an insulator disposed within the evacuated envelope of said tube, means for sweeping the electron beam of the tube along a line over the insulator, a first generator of recurrent pulses, means to apply pulses from said generator to intensify the cathode ray beam and generate a charge on said insulator, deflecting means for deflecting the beam in a direction inclined with respect to said line, a source of recurrent deflecting voltages, said deflecting voltages being phased to occur at least partly after each of said pulses, means to apply said voltages to said deflecting means, a second generator for generating pulses phased to occur at least partly after each of the first-named pulses, a pick-up plate for receiving signal voltages corresponding to changes in said charge on said insulator and means for applying said signal voltages to control the application of pulses from said second generator to prolong the intensification of the cathode ray beam.

6. A method of storing information in the form of electric charges on an insulator comprising the steps of sweeping an electron beam along a line over the insulator, intensifying the beam to produce on the insulator a first state of charge representative of one item of information, deflecting the beam in a direction inclined to said line at an angle of from thirty to ninety degrees during the intensification of said beam to produce on the insulator a second state of charge representative of another item of information, picking up transient pulse signals from charges on the insulator and controlling the intensity of said beam by the transient pulse signals in order to regenerate said charges.

7. An information storage device comprising a cathode ray tube, an insulator, pickup means associated with said insulator for receiving voltages corresponding to changes in charge of said insulator, means for sweeping the electron beam of the tube along a line over the insulator, means for deflecting the beam in a direction inclined with respect to said line, a gating circuit connected to the control grid of said cathode ray tube, amplifier means connecting said pickup means and said gating means, pulse generating means connected to said deflecting means and said gating circuit, said gating circuit having information input and output terminals, whereby the beam may be intensified to produce on the insulator a first state of charge representative of one item of information and deflected during the period of intensification to produce on the insulator a second state of charge representative of another item of information with high space efficiency and such states of charge may be regenerated to maintain them for a desired period, may be read and may be changed by rewriting as desired.

8. The combination set forth in claim 7, said gate circuit comprising a grid controlled tube connected to said amplifier and having its grid connected to a source of pulses, a cathode follower tube connected to the plate of said grid controlled tube through voltage limiting means, stabilizing condenser means connected to the control grid of said cathode follower tube, a grid controlled tube having its grid connected to the cathode of said cathode follower and a second cathode follower tube having its control grid connected to the plate of said last named tube, the output of said second cathode follower being connected to the control grid of said cathode ray tube.

9. In combination an information storage device comprising a cathode ray tube, an electric charge-retaining surface, means for sweeping the electron beam of the tube along a line over said electric charge-retaining surface, first control means controlling the beam to produce on the charge-retaining surface a first state of charge representative of one item of information, and second control means for deflecting the beam in a direction inclined with respect to said line in order to produce on the charge-retaining surface a second state of charge representative of another item of information.

10. The combination set forth in claim 9 in which said first control means comprises means for switching off the beam during scanning.

11. The combination set forth in claim 1, and means for switching off the beam during scanning.

12. The combination as set forth in claim 9 comprising a pick-up plate capacitively coupled to said charge-retaining surface and means to apply voltages generated in said plate when charged areas of said surface are bombarded by said beam to control said beam in order to regenerate the charges on said areas.

References Cited in the file of this patent

UNITED STATES PATENTS

| | | |
|---|---|---|
| 2,034,704 | Nakashima et al. | Mar. 24, 1936 |
| 2,434,264 | Edson | Jan. 13, 1948 |
| 2,439,321 | Starr | Apr. 6, 1948 |
| 2,440,301 | Sharpe | Apr. 27, 1948 |
| 2,451,005 | Weimer et al. | Oct. 12, 1948 |
| 2,454,410 | Snyder, Jr. | Nov. 23, 1948 |